Patented Jan. 5, 1932

1,839,982

UNITED STATES PATENT OFFICE

WILLIAM J. McCAUGHEY, OF COLUMBUS, OHIO, ASSIGNOR, BY MESNE ASSIGNMENTS, TO BASIC DOLOMITE, INCORPORATED, OF MAPLE GROVE, OHIO, A CORPORATION OF OHIO

REFRACTORY PRODUCT AND METHOD OF MAKING SAME

No Drawing.    Application filed January 11, 1927.  Serial No. 160,518.

This invention, relating as indicated to basic refractory materials and methods of making same, has more particular regard to basic refractory materials made from dolomite or its equivalent, as hereinafter explained, and certain so-called fluxing ingredients.

The object of the invention is to produce a basic refractory material which can be successfully used in various forms of refractory construction and in making various refractory bodies, whether in the form of previously shaped and burned brick, or monolithic structures, formed in situ, used in the metallurgical industries, and successfully meet the requirements of these various uses. For certain purposes, as for example in making a clinker for use in refractory brick, a moderately high silica content is desirable, and a further object of the invention is the addition of such silica, along with a certain percentage of iron oxide, through the medium, or in the form of a naturally occurring mineral. The preferred mineral, viz. glauconite, still more particularly, serves as the means of introducing potash which, although an evanescent ingredient, assists in bringing about a greater degree of maturity and sounder clinker. The method of manufacture is not necessarily limited to use with the particular combination of ingredients or, in other words, in the production of a refractory having the specific analysis hereinafter set forth, although a refractory made from such disclosed combination of ingredients and having such analysis in the finished form is superior to those hitherto produced in certain physical properties.

To the accomplishment of the foregoing and related ends, the invention, then, consists of the composition of matter and the steps involved in the manufacture of the same hereinafter fully described and particularly pointed out in the claims, the following description setting forth in detail a certain approved combination of ingredients together with one approved method of compounding the same, such disclosed composition and mode, however, constituting but one of various ways in which the principle of the invention may be used.

In U. S. Patent No. 1,230,430, granted George W. Patnoe under date of June 19, 1917, there is disclosed a refractory material consisting of a granular product resulting from the calcination or firing at an elevated temperature of a mixture of finely divided magnesian limestone, and a small percentage of argillaceous matter, such matter being defined as including silica, alumina and iron oxide. It has since been discovered that the stabilization of a dolomite refractory against the disintegrating effect of hydration and dusting can be more fully brought about with a relatively small amount of fluxing material, thereby maintaining high refractoriness, provided the proper selection be made of the fluxing materials that are used and provided they are used within certain ranges of ratios and amounts.

It will, however, suffice to state for the purpose in hand that the aggregate amount of the fluxing ingredients introduced may vary from approximately five (5) to approximately fifteen (15) per cent.

The following specific compositions are given by way of illustration of a stable refractory, it being understood that alumina may be substituted for the iron oxide in limited amount, although such substitution of alumina for iron oxide does cause changes in the mineralogical constitution of the product, viz:—

| Dolomite | Iron oxide | Silica |
|---|---|---|
| Per cent | Per cent | Per cent |
| 85.0 | 9.0 | 6.0 |
| 86.5 | 6.0 | 7.5 |
| 90.0 | 3.0 | 7.0 |
| 90.0 | 1.0 | 9.0 |
| 92.5 | 0.5 | 7.0 |

Other typical formulas, illustrating compositions in commercial use wherein alumina is present are also given, viz:—

| Dolomite | Iron oxide | Alumina | Silica |
|---|---|---|---|
| Per cent | Per cent | Per cent | Per cent |
| 91.00 | 4.75 | 1.5 | 2.75 |
| 95.00 | 3.00 | 1.0 | 1.00 |
| 94.00 | 2.00 | 1.5 | 2.50 |

Whatever be the particular combination of raw materials, whether that specifically disclosed in such original Patnoe patent or the various compositions just described, it is necessary that the raw dolomite or magnesium limestone and fluxes should be brought into a physical state wherein such fluxes, and particularly the silica in the case of such improved product, will readily combine with the lime (CaO). To this end such raw materials are intimately mixed, preferably by fine grinding (although with the higher ranges of fluxes herein specified, such fine grinding becomes less important), and the mixture thereupon burned at a temperature of approximately 2100 degrees F. or higher until the product becomes well shrunken and dense. In practice the mixture is preferably ground with the addition of water and the resultant slurry is then calcined, preferably in a rotary kiln, at the temperature indicated, the heat and speed of revolution of the kiln being so adjusted that the charge is kept at high temperature long enough to bring about the desired chemical reactions, as evidenced by the mixture becoming thoroughly sintered and shrunk into dense solid masses which issue from the kiln in irregularly shaped fragments of varying sizes.

In the manufacture of dolomitic refractories of the general type hereinbefore referred to, the fluxing ingredients have been introduced in the form of clay and/or iron oxide (in the form of iron ore, scale, etc.) and/or sand. I have now found that superior results are obtained if a small quantity of a compound on the order of the mineral glauconite be added to the mixture of raw ingredients, with or without further small quantities of the ingredients first named. Glauconite is essentially a hydrous silicate of iron and potassium and, as is well known, a substance which gives the color to the grains of green-sand marl. To the extent that such glauconite provides iron oxide and silica, the percentage of iron oxide and silica or sand hereinbefore prescribed will be correspondingly reduced where such glauconite is added to the raw mixture. At the same time, due to the potassium content (potash) of the mineral, the fusion point of the mixture is lowered and thus a longer reaction period provided; that is, the fusion of the mixture in course of its processing occurs earlier and more readily and a longer period thus ensures for the desired reactions between the lime and the fluxing ingredients proper. The potash, it should be explained, substantially entirely disappears in the course of the firing and so may be regarded as an evanescent ingredient, not appearing in the final product in more than a fraction of a per cent. (e. g. 0.5 per cent.) at the most, so that its action is akin to that of a catalyst, or more correctly a reaction promoter.

While reference has hereinbefore been made to dolomite or magnesian limestone as the base of the present improved refractory, it should be stated that the advantages derived from the addition of glauconite or equivalent silicates are also of a consequential character where dealing with Canadian magnesite or other magnesites containing appreciable percentages of calcium oxide for the production of a refractory in the form of a dead-burned clinker.

While I have indicated that a rotary kiln is preferably employed to heat the mixture of raw materials to the necessary temperature, it will be understood that I do not limit myself to the use of this particular instrumentality; nor in the case of such rotary kiln need the material be passed therethrough in the form of a slurry. Thus, instead of the hereinbefore described procedure, the finely and thoroughly intermixed raw materials may be compacted into the form of briquettes and these thereupon fired in a stack or tunnel type of kiln; or briquettes thus formed of the raw material may be broken up into fragments of desired size and then fired in a rotary kiln. It will also be understood, of course, that instead of starting with raw dolomite, or magnesian limestone, the specified fluxing ingredients, in corresponding larger amounts, may be combined with a mixture of calcium and magnesium oxides resulting from the calcination of such dolomite or magnesian limestone, derived from any other source.

Other modes of applying the principle of my invention may be employed instead of the one explained, change being made as regards the composition and method herein disclosed, provided the ingredients or steps stated by any of the following claims or the equivalent of such stated ingredients or steps be employed.

I therefore particularly point out and distinctly claim as my invention:—

1. A method of making a refractory material for furnace linings and the like, which comprises intermixing magnesian limestone and glauconite, and firing the mixture at a high heat to a clinkered granular product.

2. A method of making a refractory material for furnace linings and the like, which comprises intermixing magnesian limestone and glauconite, and passing the mixture through a rotary kiln at a temperature in excess of 2100° F.

3. A refractory material suitable for furnace linings and the like, consisting of the clinkered granular product material from the firing at high temperature of a mixture of magnesian limestone and glauconite.

Signed by me this 7th day of January, 1927.

WILLIAM J. McCAUGHEY.